July 1, 1924.

F. KNIGHT 1,500,081

CHICKEN HOVER, BROODER, OR FOSTER MOTHER

Filed May 18, 1923

INVENTOR
FRANK KNIGHT,
BY Bright & Bailey
Attys

July 1, 1924.

F. KNIGHT 1,500,081

CHICKEN HOVER, BROODER, OR FOSTER MOTHER

Filed May 18, 1923     3 Sheets-Sheet 2

INVENTOR
FRANK KNIGHT,
BY Bright & Bailey
Attys.

Patented July 1, 1924.

1,500,081

UNITED STATES PATENT OFFICE.

FRANK KNIGHT, OF CUCKFIELD, ENGLAND.

CHICKEN HOVER, BROODER, OR FOSTER MOTHER.

Application filed May 18, 1923. Serial No. 639,937.

*To all whom it may concern:*

Be it known that I, FRANK KNIGHT, subject of the King of Great Britain, residing at Sydnye Farm, Cuckfield, Sussex, England, have invented new and useful Improvements in Chicken Hovers, Brooders, or Foster Mothers; and I do hereby declare the following to be a full, clear, and exact description of the invention, such as will enable others skilled in the art to which it appertains to make and use the same.

This invention relates to chicken hovers, brooders or foster mothers and has for its object to provide an improved construction of such device, particularly with regard to the heating of the chick chamber.

A chicken hover, brooder or foster mother according to the present invention comprises an outer casing adapted to contain a heating element, and an inner compartment adapted to contain the chicks, said compartment being closed from communication with said outer compartment and having its walls spaced from the walls of the outer casing whereby the hot air from the heating element may be distributed around said compartment.

In order that my invention may be clearly understood and readily carried into effect an embodiment of the same is illustrated by the accompanying drawings, in which:—

Figure 5:
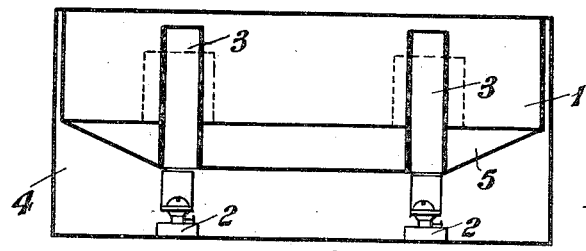
Fig. 5 is a diagrammatic view illustrating the application of a plurality of heating units.
Figure 1:
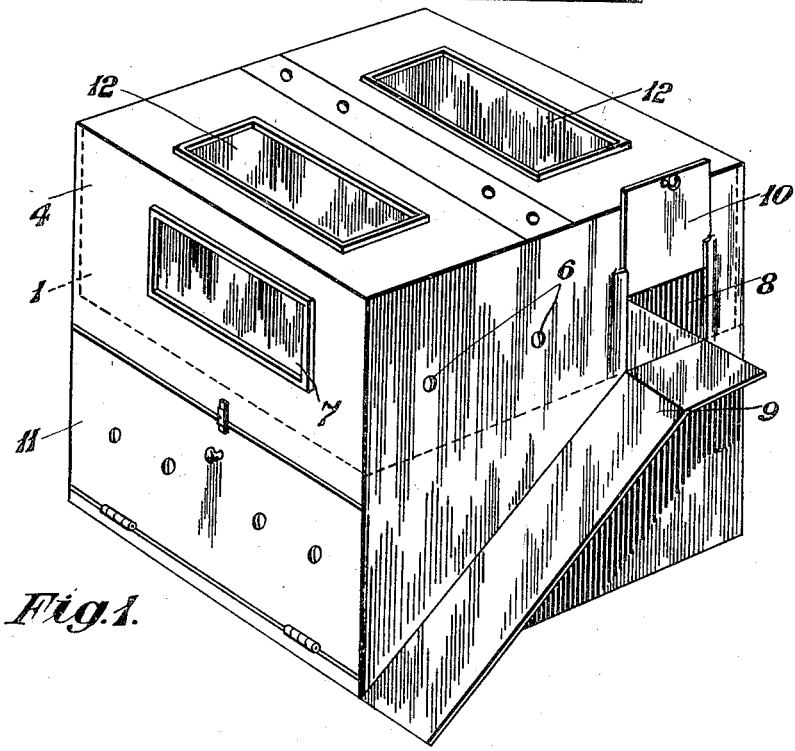
Fig. 1 is a perspective view of a hover according to the present invention.

In carrying my invention into practice the hover may be of substantially conventional rectangular configuration, but any other suitable configuration such as for instance circular may be adopted.

The compartment 1 adapted to contain the chicks is made of any suitable material such as wood or metal and is disposed above a heating unit, 2, which may be an oil, electric or gas lamp or burner. Heat is supplied from this lamp to the interior of the compartment 1 by means of a central tube 3 disposed in alignment with, but spaced apart from the lamp or burner so that the hot air and in certain cases the fumes from the burner ascend up the tube 3 whereby the compartment 1 is heated from the centre. The tube 3 is closed at the top to prevent the fumes entering the compartment. Disposed about the tube 3 is provided a wire gauze shield to prevent any chicks from moving into contact with the tube 3.

The compartment 1, is disposed within an outer casing 4 which serves to contain the heating unit and to concentrate the heat upon the said compartment.

The walls of the compartment are heated by the hot air or gases which play around the outside of the said walls. This is effected by spacing the walls of the inner compartment 1 from the walls of the casing 4, so that a narrow space is provided around the compartment which when the heating unit is in use is constantly charged with hot air or gases. This spacing arrangement will also serve to insulate the inner compartment to a great extent from the cooling effect of the atmosphere.

The tube 3 extends downward from the compartment 1 into the casing 4, and at or near to the lower edge of the tube is or are connected to a plate or plates 5 secured to the outer edge of the compartment 1, thereby providing a chamber substantially triangular in cross section which serves to prevent the hot air or gases actually contacting with the floor of the compartment 1 so that the floor does not grow too hot.

The compartment 1 is ventilated by means of a number of apertures 6 communicating with the atmosphere, these holes being connected by means of flanged tubes to the wall of the casing to prevent the access of hot air or gases into the compartment 1. The top of the chicks compartment may be detachable or formed with a movable portion or portions to facilitate access to the interior of the compartment. A window or windows 12, which if desired may constitute the movable portion or portions is, or are, provided in the top of the compartment for the admission of light. Also, or alternatively, if desired a window 7 may be provided in the side of the casing 4 for the illumination of the interior of the compartment 1.

To enable the chicks to conveniently walk into or out of the hover, so that it may be used in a chicken house, or when adapting the invention to a brooder having more than one compartment, an aperture 8 is formed in one or more sides of the hover or brooder communicating with the interior of the compartment 1 and a sloping platform 9 leading to the lower edge of the casing. This aperture may be closed by a door 10, slidably or hingedly connected to the casing 4.

Figure 4:
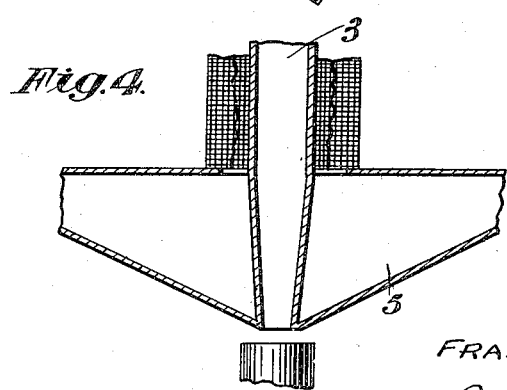
Fig. 4 is a segmental view illustrating a modification.
Figure 2:
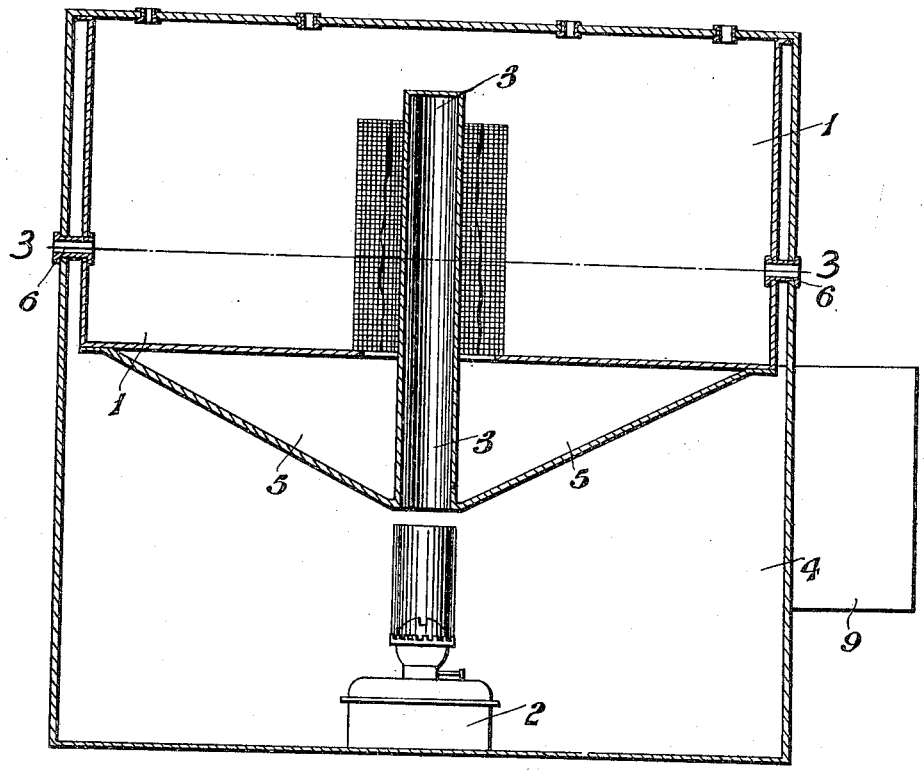
Fig. 2 is a sectional elevation.
Figure 3:
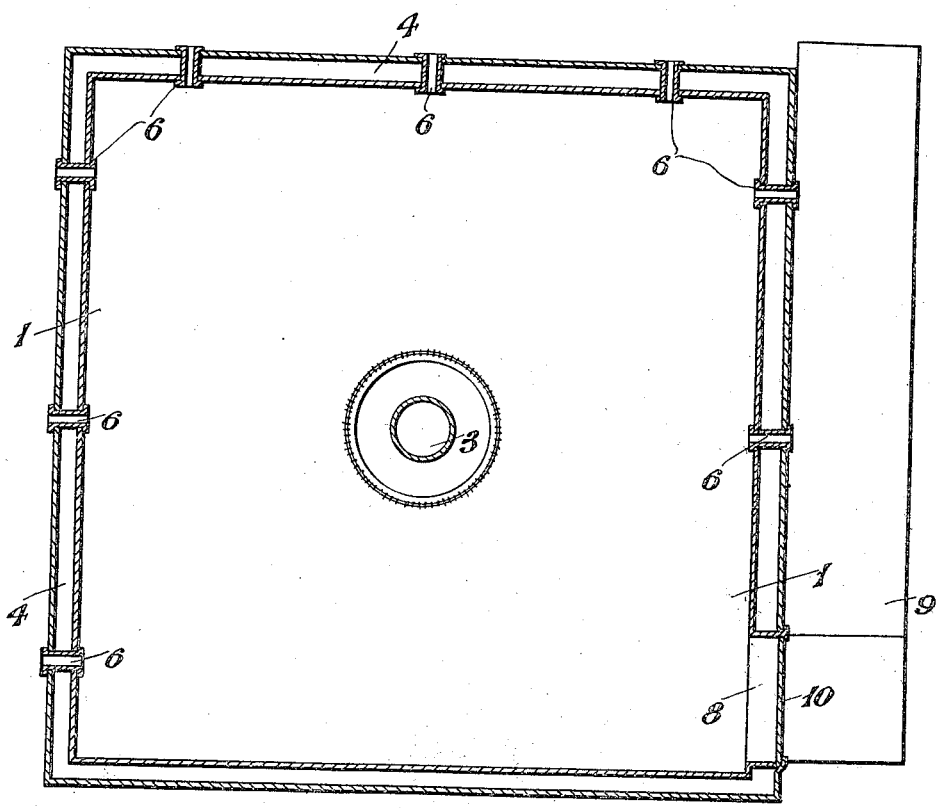
Fig. 3 is a sectional plan on the line 3—3 of Fig. 2.

Instead of having the tube 3 of uniform diameter throughout its length as shown in Fig. 2 it may be tapered at its lower end to assist in deflecting the hot air or gases around the compartment 1 as shown in Fig. 4.

A door 11 is provided in the casing 4 to facilitate access to the lamp.

What I claim is:—

1. A chicken brooder comprising a casing, a compartment within and spaced from said casing, a heating element adapted to be placed within said casing below said compartment for supplying warmth to said compartment, a partition extending from the floor of said compartment into said casing providing a closed heat insulating chamber between said compartment and said heating element, and a tubular member extending through said partition and the floor of said compartment to conduct heat from said heating element directly into said compartment.

2. A chicken brooder comprising a casing, a compartment within and spaced from said casing, a heating element adapted to be placed within said casing below said compartment for supplying warmth to said compartment, a partition extending from the floor of said compartment into said casing providing a closed heat insulating chamber between said compartment and said heating element, said partition being inclined downwardly from the sides of said compartment towards said heating element thereby to direct air heated by said heating element into the space between said casing and said compartment to heat the latter, and a tubular member extending through said partition and the floor of said compartment to conduct heat from said heating element directly into said compartment.

In witness whereof I have signed this specification in the presence of two witnesses.

FRANK KNIGHT.

Witnesses:
T. O. HUGHES,
A. C. MICKLIN.